United States Patent
Voss et al.

(10) Patent No.: US 8,608,837 B2
(45) Date of Patent: *Dec. 17, 2013

(54) PROCESS FOR PRODUCING CARBON MEMBRANES

(75) Inventors: Hartwig Voss, Frankenthal (DE); Joerg Therre, Worms (DE); Nadine Kaltenborn, Alsdorf (DE); Susanne Kaemnitz, Rauschwitz (DE)

(73) Assignee: BASF SE, Ludwigshafen (DE)

( * ) Notice: Subject to any disclaimer, the term of this patent is extended or adjusted under 35 U.S.C. 154(b) by 147 days.

This patent is subject to a terminal disclaimer.

(21) Appl. No.: 13/250,057

(22) Filed: Sep. 30, 2011

(65) Prior Publication Data

US 2012/0079943 A1 Apr. 5, 2012

Related U.S. Application Data

(60) Provisional application No. 61/388,649, filed on Oct. 1, 2010.

(51) Int. Cl.
*B01D 53/22* (2006.01)

(52) U.S. Cl.
USPC .................. 96/11; 95/43; 95/45; 96/4; 96/12

(58) Field of Classification Search
USPC .................... 95/43, 45; 96/4, 11, 12
See application file for complete search history.

(56) References Cited

U.S. PATENT DOCUMENTS

| | | | |
|---|---|---|---|
| 4,640,901 A * | 2/1987 | Lee et al. ................ 501/81 |
| 6,503,295 B1 | 1/2003 | Koros et al. | |
| 6,562,110 B2 * | 5/2003 | Koros et al. ............... 96/4 |
| 6,585,802 B2 * | 7/2003 | Koros et al. .............. 95/51 |
| 7,014,681 B2 * | 3/2006 | Noack et al. .............. 95/54 |
| 7,404,844 B2 * | 7/2008 | Tin et al. .................. 95/45 |
| 7,854,788 B2 * | 12/2010 | Byrd et al. ............... 95/45 |
| 8,083,833 B2 * | 12/2011 | Liu et al. ................. 95/45 |
| 2002/0053284 A1 | 5/2002 | Koros et al. | |
| 2002/0056369 A1 | 5/2002 | Koros et al. | |
| 2011/0197762 A1 | 8/2011 | Voss et al. | |
| 2012/0079944 A1* | 4/2012 | Vo et al. ................... 96/11 |

FOREIGN PATENT DOCUMENTS

| | | |
|---|---|---|
| EP | 0 671 202 A2 | 9/1995 |
| EP | 2 045 001 A1 | 4/2009 |
| WO | WO 00/62885 | 10/2000 |
| WO | WO 01/97956 A1 | 12/2001 |
| WO | WO 2010/037690 A1 | 4/2010 |

OTHER PUBLICATIONS

P.J.F Harris, "Rosalind Franklin's work on coal, carbon, and graphite", Interdisciplinary Science Reviews, vol. 26, No. 3, 2001, pp. 204-210.
U.S. Appl. No. 13/250,232, filed Sep. 30, 2011, Voss, et al.
International Search Report issued Nov. 2, 2011 in Application No. PCT/EP2011/067071.
S.M. Saufi, et al., "Fabrication of carbon membranes for gas separation—a review", Carbon, vol. 42, 2004, pp. 241-259.
Antonio B. Fuertes, "Effect of air oxidation on gas separation properties of adsorption-selective carbon membranes", Carbon, vol. 39, 2001, pp. 697-706.
Calre J. Anderson, et al., "Effect of pyrolysis temperature and operating temperature on the performance of nanoporous carbon membranes", Journal of Membrane Science, vol. 322, 2008, pp. 19-27.
H. Börder, et al., "New Forms of Carbon", Naturwissenschaften, vol. 57, 1970, pp. 29-36.
Von Erich Fitzer, "Thermal degradation of polymers to elemental carbon—a path to materials of the future", Angew. Chem., vol. 92, 1980, pp. 375-386.
Erich Fitzer, "From Polymers to Polymeric Carbon—A Way to Synthesize a Large Variety of New Materials", Pure & Appl. Chem., vol. 52, 1980, pp. 1865-1882.
P.J.F. Harris, "Carbonaceous contaminants on support films for transmission electron microscopy", Carbon, vol. 39, 2001, pp. 909-913.

\* cited by examiner

*Primary Examiner* — Jason M Greene
*Assistant Examiner* — Anthony Shumate
(74) *Attorney, Agent, or Firm* — Oblon, Spivak, McClelland, Maier & Neustadt, L.L.P.

(57) ABSTRACT

The use of solutions of ethylenically unsaturated polyesters for production of carbon membranes suitable for gas separation, and a process for producing carbon membranes suitable for gas separation, comprising the steps of a) coating a porous substrate with a solution of ethylenically unsaturated polyester, b) drying the polyester coating on the porous substrate by removing the solvent, and c) pyrolyzing the polyester coating on the porous substrate to form the carbon membrane suitable for gas separation, it being possible to conduct any of steps a) to c) or the sequence of steps a) to c) more than once.

13 Claims, No Drawings

PROCESS FOR PRODUCING CARBON MEMBRANES

The invention relates to processes for producing carbon membranes suitable for gas separation, to carbon membranes obtainable by the process and to the use of specific polymer solutions for production of such carbon membranes.

The use of carbon membranes for gas separation is known per se. This exploits the interlayer spacing of graphite, which at 3.35 Å is within the order of magnitude of the size of small gas molecules.

The carbon synthesized by the pyrolysis of organic materials is referred to as paracrystalline carbon, since it exhibits greater or lesser deviation from the ideal crystal structure. It has small periodic regions, but exhibits diffuse x-ray reflections and is therefore referred to as x-ray-amorphous. Glass-like microporous carbon has a lower density at 1.2-1.6 g/cm$^3$ than crystalline graphite at 2.2 g/cm$^3$, and a narrow pore size distribution. Owing to the high proportion of open porosity, the carbon has excellent suitability as an adsorbent.

Amorphous or microcrystalline carbon films have high chemical inertness. They consist of sp$^2$ and sp$^3$ bonds and therefore exhibit properties between those of graphite and diamond. The graphite-like structures consist of a turbostratically disordered layer sequence in which the microcrystals are joined by highly deformed and disorientated graphite layers.

Different theories have been established in the past about the exact bonding conditions in x-ray-amorphous carbon. Robertson and O'Reilly propagated a model in which amorphous carbon consists of sp$^2$ bond clusters which are networked with one another via sp$^3$ bonds. Côté and Liu, in contrast, expressed the theory that amorphous carbon consists solely of sp$^2$ bonds which are three-dimensionally networked. Experiments supported the conjecture of dispersed crosslinked sp$^2$ bonds. In amorphous and nanocrystalline carbon, according to Lossy et al., a mixture of sp$^2$ and sp$^3$ bond types is present. If these clusters become large enough, it is possible for nanocrystalline graphite and diamond structures to form.

In the case of use of nanoporous carbon as a membrane material, it is possible to achieve high permeances with simultaneously high selectivity. Gas permeation in carbon membranes is simpler than in polymer membranes since the gases do not dissolve in the carbon. A distinction is drawn between two kinds of carbon membranes: the molecular sieve carbon membranes (MSCM) and the adsorptive selective carbon membranes (ASCM). MSCMs allow the separation of gas mixtures with different molecule diameters due to the size exclusion of the larger molecule type.

In contrast, ASCMs allow the separation of gas mixtures with similar molecular radii or even the removal of larger from small molecules.

The permeation characteristics of adsorbable and nonadsorbable gases are based on different mechanisms. While the permeation of nonadsorbing gases in the ideal case can be understood as pure gas diffusion, the permeation of adsorbable gases is determined by surface diffusion processes. In mixtures of adsorbable and nonadsorbable gases, the permeation of the nonadsorbing component is hindered by the adsorbed gas molecules. The nonadsorbing gases first have to overcome a potential barrier for the diffusion through the membrane. In reality, gas diffusion and surface diffusion always occur at the same time. The separation works by the selective adsorption and surface diffusion of one component to the low-pressure side of the membrane, where it is ultimately desorbed.

Depending on the synthesis operation, such as sintering and mild activation operations, the pore sizes of the MSCMs are in the range between 2.8-5.2 Å. The pore sizes in ASCMs are clearly greater at 5-7 Å.

A further crucial advantage of carbon is the possibility of controlled adjustment of the pore size by thermochemical treatment, which enables production of membranes with different permeation and separation properties from the same starting material. Carbon membranes have a high chemical stability to acids, alkalis and organic solvents. Nanoporous carbon membranes, compared to polymer membranes, can be used under nonoxidizing conditions at high temperatures of up to 900° C.

One disadvantage of carbon lies in the limited stability thereof to oxidizing media and water vapor. Moreover, carbon membranes are more brittle than polymer membranes and can become blocked by adsorbing gases, for example chlorine gas. The adsorbed gas molecules can be removed again at temperatures of ≥200° C. The preferred process temperatures should therefore be within this range.

One of the first representatives of the group of glass-like carbons is "cellulose carbon" which forms as a result of pyrolytic conversion of cellulose to carbon under defined thermal treatment.

The production of carbon fiber membranes from cellulose fibers by pyrolysis is described, for example, in EP-A-0 671 202.

WO 00/62885 describes the use of polymeric phenolic resins for formation of carbon membranes suitable for gas separation. This involves dissolving the phenolic resins in methanol.

WO 01/97956 describes the production of nanoporous carbon membranes by pyrolysis of selected polymers on porous substrates. Preferred polymers mentioned include polyfurfuryl alcohol, polyvinyl chloride and polyacrylonitrile. These are mixed with additives, preferably titanium dioxide, silicon dioxide zeolites or polyethylene glycol, and applied to a substrate. This is followed by the pyrolysis.

EP-A-2 045 001 describes the use of phenol resins, melamine resins, urea resins, furan resins, polyimide resins or epoxy resins, and of resins based on polyethylene and cellulose, dissolved in organic solvents, for production of carbon membranes by film formation and subsequent pyrolysis of the resin. Furthermore, EP-A-2 045 001 describes the construction of the carbon membrane, consisting of a porous substrate, subsequent porous ceramic layers, and the carbon layer, with the last interlayer to which the carbon membrane is applied being prepared from a TiO$_2$ sot and having a pore diameter of between 0.3 and 20 nm. Moreover, the membrane was tested only for the separation of water and ethanol by pervaporation at 75° C. This test does not allow suitability for gas separation at higher temperatures.

Preferred precursors for the synthesis of isotropic carbon products are generally hydrocarbon-based polymers which after pyrolysis leave a high fraction of microcrystalline carbon and which decompose with dimensional stability [1] [2] [3] [4]. The same is true of the synthesis of carbon membranes [5]. With coatings, the advantage exists here that the thickness of the carbon layer obtained after pyrolysis can be adjusted more effectively by way of the layer thickness of the precursor polymer. Decomposition with dimensional stability is not only desirable for the coating of complex support geometries, but also prevents melting [6] and restructuring into the more energetically favorable form of graphite, and also the development of defects (such as pinholes, for example), which could come about through escaping gaseous decomposition products [7]. Polymers such as phenolic resin or polyfurfuryl alcohol are therefore obvious for the synthesis of carbon membranes [8] [9] [10], since pyrolysis leaves 35% by mass or 55% by mass, respectively, of the polymer in the form of carbon [4] [3].

[1] E. Fitzer, "Thermal degradation of polymers to elemental carbon—a path to materials of the future", *Angew. Chem.*, 92, 375-386 (1980).

[2] E. Fitzer, "From polymers to polymeric carbon—A way to synthesize a large variety of new materials", *Pure & Appl. Chem.*, 52, 1865-1882 (1980).

[3] H. Böder and E. Fitzer, "New forms of carbon", *Naturwissenschaften*, 57, 29-36 (1970).

[4] A. Gardziella, L. Pilato and A. Knop, 2000.

[5] W. Koros and D. Vu, San Ramon, United States, 2002.

[6] P. Harris, University of Reading, Whiteknights, UK, 2001

[7] A. Soffer, D. Rosen, S. Saguee and J. Koresh, Germany, 1992.

[8] S. Saufi and Ismail A F, "Fabrication of carbon membranes for gas separation—a review", *Carbon*, 42, 241-259 (2004).

[9] A. Fuertes, "Effect of air oxidation on gas separation properties of adsorption-selective carbon membranes", *Carbon*, 39, 697-706 (2001).

[10] C. J. Anderson, S. J. Pas, G. Arora, S. E. Kentisch, A. J. Hill, S. I. Sandler and G. W. Stevens, "Effect of pyrolysis temperature and operating temperature on the performance of nanoporous carbon membranes", *Journal of Membrane Science*, [322], 19-27 (2008).

Before the pyrolysis step, the polymer membranes are often subjected to a physical or chemical pretreatment. Physical pretreatment is understood to mean, for example, the stretching of hollow fibers. The chemical treatment processes include, for example, treatment with carbonization catalysts such as mineral acids, or treatment with chemicals such as dimethylformamide to achieve narrow pore size distributions. A further pretreatment method is that of treatment under oxidizing atmosphere such as air at elevated temperature.

The pyrolysis of the synthetic polymers under inert gas atmosphere gives rise to high-porosity carbon, the pore sizes of which can vary greatly as a function of the type and morphology of the polymer and the pyrolysis conditions. Controlled heat treatment can adjust the pore size of the carbon membranes. The pyrolysis conditions have an important influence on the separation properties of the carbon. Heating rate, pyrolysis temperature and pyrolysis time are parameters adjustable in a defined manner. Supply of thermal energy breaks the bonds in the polymer, and the result is formation of the carbon membrane.

The known membranes do not yet have a suitable profile of properties for all separation tasks. In some cases, the membranes cannot be produced in a reproducible manner, i.e. the membrane properties vary in each batch.

It is an object of the present invention to provide a process for production of carbon membranes suitable for gas separation, or to provide a polymer suitable for production of the carbon membranes, and the resulting membranes should avoid the disadvantages of the prior art and should exhibit excellent separation properties with ideal reproducibility.

The object is achieved in accordance with the invention by use of solutions of ethylenically unsaturated polyesters for production of carbon membranes suitable for gas separation, said membranes additionally possessing preferably the following separation properties for the separation of hydrogen from a gas mixture at temperatures between 150 to 450° C., determined from mixture-gas measurements:

Hydrogen permeancies of $\geq 2$ $Nm^3/m^2/h/bar$ and hydrogen permselectivities$\geq 30$ Definition of permeance: flow rate in cubic meters under standard temperature and pressure conditions ($Nm^3$) of gas per $m^2$ of membrane area, time and pressure, the pressure (driving force) used being the partial pressure difference between feed/retentate and permeate of the corresponding gas.

Definition of permselectivity: the permselectivity is then given by the ratio of the permeances ascertained.

The object is additionally achieved by a process for producing carbon membranes suitable for gas separation, comprising the steps of:

a) coating a porous substrate with a solution of ethylenically unsaturated polyester, b) drying the polyester coating on the porous substrate by removing the solvent, c) pyrolyzing the polyester coating on the porous substrate to form the carbon membrane suitable for gas separation, it being possible to conduct any of steps a) to c) or the sequence of steps a) to c) more than once.

The object is also achieved by carbon membranes obtainable by the above process.

It has been found in accordance with the invention that the use of solutions of ethylenically unsaturated polyesters leads to carbon membranes with excellent separation properties and ideal reproducibility.

Additionally it has been found that, when the precursors used are polyester resins which have a very high degree of decomposition and, accordingly, a carbon yield of only 5% by mass, particularly highly performing carbon membranes can be produced.

The membranes can be produced by the known processes, as described, for example, in the literature cited at the outset.

The ethylenically unsaturated polyesters used may be any suitable ethylenically unsaturated polyesters. The ethylenically unsaturated polyester preferably has repeat units of aliphatic diols, aromatic dicarboxylic acids and ethylenically unsaturated dicarboxylic acids. The ethylenically unsaturated polyester used in accordance with the invention can be prepared proceeding from aliphatic diols, aromatic dicarboxylic anhydrides and ethylenically unsaturated dicarboxylic anhydrides.

The aliphatic diols are preferably $C_{2-12}$-alkanediols, more preferably $C_{2-6}$-alkanediols, especially $C_{2-4}$-alkanediols. They may be linear or branched alkanediols in which the hydroxyl groups are terminal or nonterminal. Preference is given to using linear aliphatic alkanediols in which the hydroxyl groups are terminal or nonterminal. Especially preferably, 1,2-propanediol is used as the alkanediol.

The ethylenically unsaturated dicarboxylic acid is preferably maleic acid. It is especially used for preparation of the ethylenically unsaturated polyester in the form of maleic anhydride.

The aromatic dicarboxylic acids may be selected from any suitable aromatic dicarboxylic acids. They may, for example, be phthalic acid, isophthalic acid or terephthalic acid. The aromatic dicarboxylic acid is preferably phthalic acid, which is used for preparation of the ethylenically unsaturated polyesters in the form of phthalic anhydride.

In the ethylenically unsaturated polyester, diols and dicarboxylic acids may be present in equivalent amounts. Preference is given to working with a slight did excess, such that the resulting polyesters have more alcohol end groups than carboxylic acid end groups. The excess of diol over dicarboxylic acid may be 1 to 20%, preferably 2 to 10%, especially 3 to 7%.

Aromatic dicarboxylic acids and ethylenically unsaturated dicarboxylic acids can be used in any suitable molar ratios. Aromatic dicarboxylic acids and ethylenically unsaturated dicarboxylic acids are preferably used in a molar ratio of 0.1:1 to 1:0.1, more preferably 0.3:1 to 1:0.3, especially 0.09:1 to 1:0.9. Particular preference is given to working with equimolar amounts of aromatic dicarboxylic acids and ethylenically unsaturated dicarboxylic acids.

The monomers mentioned are used to prepare the ethylenically unsaturated polyesters under the customary conditions, and the ethylenically unsaturated groups of the ethylenically unsaturated dicarboxylic acids should be substantially preserved. For the preparation of the ethylenically unsaturated polyesters, reference may be made to known processes.

Ethylenically unsaturated polyesters used with preference in accordance with the invention have a molecular weight in the range from 100 to 2000 g/mol, more preferably 200 to 600 g/mol. The viscosity of the polyesters is preferably 4 mPas to 200 mPas, more preferably 10 to 40 mPas.

The solution of ethylenically unsaturated polyesters preferably additionally comprises a crosslinking ethylenically unsaturated monomer and a free-radical former as a crosslinking initiator. The crosslinking ethylenically unsaturated monomer is preferably styrene or α-methylstyrene. The free-radical formers used may be any free-radical polymerization initiators. For example, it is possible to use dibenzoyl peroxide as the free-radical former. On application of the solution of ethylenically unsaturated polyesters to the porous substrate, the polyester is preferably as yet uncrosslinked or at most partially crosslinked to such an extent that its flowability is preserved.

Useful solvents are all solvents suitable for polyesters, preferably styrene, α-methylstyrene or acetone.

In one embodiment of the invention, the crosslinking ethylenically unsaturated monomer is used as a solvent, which means that, when the ethylenically unsaturated monomer is used, a further solvent is dispensed with. In the case of suitable adjustment of the viscosity of the ethylenically unsaturated polyester, it is likewise possible, in one embodiment of the invention, to dispense with the addition of a solvent. This is the case especially when the ethylenically unsaturated polyester is free-flowing at ambient temperature (22° C.).

More preferably, the ethylenically unsaturated polyester is used together with the crosslinking ethylenically unsaturated monomer without the addition of further solvents or diluents in the coating in step a).

In this case, the proportion of the crosslinking ethylenically unsaturated monomer in the mixture of ethylenically unsaturated polyester and ethylenically unsaturated monomer is preferably 0.1 to 5% by weight, more preferably 0.2 to 2% by weight, or preferably 20 to 100% by weight, more preferably 40 to 80% by weight.

The porous substrate can be coated with the solution of ethylenically unsaturated polyester by any suitable coating processes. The solution can be applied by dipping, spraying, impregnation processes, etc. Preference is given to using a dip coating process to apply the solution of ethylenically unsaturated polyester. The application of the ethylenically unsaturated polyester can also be achieved by ink coating and ultrasonic deposition (UD). Corresponding processes are described, for example, in EP-A-2 045 001 and WO 01/97956.

After the coating of the porous substrate with the solution of ethylenically unsaturated polyester, the polyester coating is dried on the porous substrate. This removes any solvent present. In the case of use of a crosslinking ethylenically unsaturated monomer, excess amounts of this monomer are likewise removed in the course of drying. The drying is preferably conducted at a temperature in the range from 0 to 70° C., more preferably 17 to 30° C., especially at ambient temperature (22° C.), for a Period of 0.1 to 50 hours, preferably 2 to 24 hours.

Before the pyrolysis in step c), after the drying b) or as part of the drying, curing can be conducted at slightly elevated temperatures. Curing is preferably effected at temperatures in the range from 20 to 150° C. or 50 to 250° C., more preferably 60 to 100° C., for a period of 1 to 100 hours or 4 to 20 hours, preferably 6 to 24 hours or 6 to 12 hours. The curing crosslinks the ethylenically unsaturated polyester. The crosslinking prevents the melting and hence also the structural rearrangement of the crosslinked polyester to the energetically more favorable state of graphite.

Before the pyrolysis step, the polymer membranes can also be subjected to a physical or chemical pretreatment. The chemical pretreatment processes include, for example, treatment with carbonization catalysts such as mineral acids, or treatment with chemicals such as dimethylformamide to achieve narrow pore size distributions. Additives such as polyethylene glycol, Lewis acids and ionic salts have been described in the literature cited at the outset, especially in EP-A-0 671 202. Such a pretreatment can also be effected in accordance with the invention, but is often unnecessary since a suitable pore size structure is obtained merely through use of the polyesters used in accordance with the invention. Further suitable pore formers are $SO_3NH(C_2H_5)_3$, triethylammonium nitrate and $(—C(CF_3)_2—)$hexafluorisopropylidene groups. The permeability of the membrane can be controlled via the type and amount of the pore formers.

At the time of pyrolysis, the polyesters used in accordance with the invention are preferably either already crosslinked or cure in the low-temperature range of the pyrolysis. Before the crosslinking, preferably all solvents should be removed from the polymer coating since they can lead to bubble formation and to defects in the polymer layer in the course of heating. The degree of crosslinking and crosslinking temperature can influence the permeability and selectivity of the later membrane.

The pyrolysis of the polyester coating on the porous substrate to form the carbon membrane in step c) is preferably performed under inert gas at temperatures in the range from 500 to 900° C., more preferably from 650 to 750° C. The pyrolysis is preferably performed for a period of 0.1 to 24 hours, preferably 0.5 to 17 hours, more preferably 1 to 10 hours, especially 1 to 2 hours.

Under some circumstances, it may be advisable to perform the pyrolysis in the presence of small amounts of oxygenous gases. However, preference is given in accordance with the invention to performing the pyrolysis under inert gas, for example under a nitrogen and/or argon atmosphere.

The pyrolysis gives rise to high-porosity carbon, the pore sizes of which can be varied as a function of the type and morphology of the precursor and the pyrolysis conditions. Controlled heat treatment can adjust the pore size of the carbon membrane. The pyrolysis conditions have an influence on the separation properties of the resulting carbon membrane. The heating rate, pyrolysis temperature and pyrolysis time are adjustable parameters. Supply of thermal energy breaks the bonds in the polymer. During the decomposition of the polymer, a series of gaseous by-products is formed, as a result of which a significant loss of mass occurs.

After the pyrolysis, the resulting carbon membrane, if required and desired, can be subjected to further treatment steps. For example, the membrane can be activated by heat treatment under air at temperatures of 100° C. to 500° C. Activation in a carbon dioxide stream is also possible in accordance with the invention. However, preference is given in accordance with the invention to not performing any such aftertreatment after the pyrolysis in step c), and the carbon membranes which result from the pyrolysis are instead directly suitable for gas separation.

The carbon membrane obtained in accordance with the invention preferably has a mean pore diameter in the range from 0.1 to 0.7 nm or 0.25 to 0.4 nm, more preferably 0.25 to 0.45 nm, especially 0.3 to 0.4 nm. These membranes preferably allow only molecules with a relatively small kinetic gas diameter, which can penetrate into the pore system of the membrane, to pass through. These are especially hydrogen, water, ammonia and helium. The mechanism of the separation of these gases is not based on different adsorption and transport characteristics of the gases to be separated, but on shape-selective separation (molecular sieving). In this case, it is ensured that the flow of the permeating gases rises in a linear manner with the driving force.

Particular preference is given to effecting the following separations by means of the carbon membrane obtained in accordance with the invention, optionally in combination with chemical reactions to shift the equilibrium:

separation of hydrogen from hydrocarbons from $C_1$ upwards, for example in dehydrogenations.

According to the invention, the target use temperatures are in the range from 200 to 500° C.

The inventive carbon membranes are preferably produced in the form of asymmetric membranes. The selection of the porous substrate (carrier) depends firstly on the chemical reactivity and compatibility with the carbon, the mechanical stability, but also on economic factors such as costs and availability. Suitable porous substrates are porous materials such as porous metals, porous ceramics, porous glasses or porous composites thereof.

The porous substrate more preferably has a mesoporous ceramic oxide layer of $TiO_2$, $ZrO_2$, $Al_2O_3$, $SiO_2$ or mixtures thereof, which is coated with the solution of the ethylenically unsaturated polyester.

The mesoporous ceramic oxide layer is more preferably formed from $\gamma$-$Al_2O_3$.

In one embodiment of the invention, the mesoporous ceramic oxide layer has a baking temperature below the pyrolysis temperature in step c). This mesoporous ceramic oxide layer is preferably coated in unbaked form with the solution of the ethylenically unsaturated polyester, in which case the baking of the mesoporous ceramic oxide layer is simultaneous with the pyrolysis. This can lead to a particularly advantageous spectrum of properties of the resulting carbon membrane.

The use of steel as the carrier material gives rise to the advantage of standardized, well-controllable and reproducible manufacture. In the case of use of steel, it is, however, impossible to produce porous carriers from a layer composite, which would allow high permeabilities and selectivities to be combined with one another.

Therefore, carbon membranes on ceramic porous carriers are preferred. They preferably consist of a composite of ever finer layer thicknesses and pore sizes. Since defects in the surface of the substrates can cause defects in the carbon membrane, such as pinholes, which can lead to the loss of the molecular sieving properties of the membrane, it is advantageous to reduce the surface topography and the defect structure of the carrier by coating the porous carrier with intermediate layers.

The basic structure of the preferred inventive membrane is described in EP-A-2 045 001. Reference may be made especially to FIG. 1 therein with the corresponding explanations in the description.

On the preferred coarse-pore $Al_2O_3$ carrier, a smaller-pore layer is preferably followed by a mesoporous ceramic oxide layer of $\gamma$-$Al_2O_3$ with a pore diameter in the range from preferably 2 to 10 nm, more preferably 3 to 7 nm, especially preferably 4 to 6 nm. The layer thickness of this mesoporous ceramic oxide layer is preferably 0.1 to 10 μm, more preferably 0.5 to 5 μm, especially 1 to 2 nm, in particular 1 to 1.5 nm.

By virtue of the fact that the pore diameter in the porous substrate cross section decreases toward the carbon membrane, a pressure drop in the porous substrate can be avoided, while at the same time establishing suitable pore sizes in the carbon membrane. This design of the membrane can ensure high flows through the membrane in the particular separation task.

The invention is illustrated in detail by the examples below.

EXAMPLES

Example 1

The precursor solution was prepared by reaction of a diol with at least one unsaturated carboxylic acid to give an unsaturated polyester and subsequent addition of an olefin. In the specific case, in a 250 ml two-neck flask, 19.98 g of 1,2-propanediol (0.25 mol+5% excess; VWR), 12.26 g of maleic anhydride (0.125 mol; VWR) and 18.52 g of phthalic anhydride (0.125 mol; VWR) were weighed in. Subsequently, 0.01 g of hydroquinone (VWR) was added as a polymerization inhibitor, in order to prevent premature polymerization or crosslinking processes. Under nitrogen, the raw materials weighed in were heated to a reaction temperature of 200° C. by means of an oil bath. To check chain formation, the acid number was determined by titration with KOH solution at regular intervals. At an acid number of approx. 50, the reaction was stopped by rapid cooling to 140° C. With the aid of a dropping funnel, 50 g of styrene were subsequently added as a crosslinker within one minute while stirring vigorously. The styrene added had previously been heated to 50° C. In order to prevent premature polymerization of the polyester-styrene mixture, the unsaturated polyester resin solution was cooled to room temperature in a water bath. Thereafter, 1% dibenzoyl peroxide (VWR) as a free-radical former was added to the polyester-styrene mixture and then the mixture was stirred at room temperature for 5 minutes.

The carriers used for the membranes were ceramic single-channel tubes of $\alpha$-$Al_2O_3$ of length 105 mm with internal diameter 7 mm and external diameter 10 mm, which had intermediate layers with decreasing pore size on the inside. The uppermost intermediate layer used was a $\gamma$-$Al_2O_3$ layer with a pore size of 5 nm and a thickness of 1-2 μm.

This was coated in a dip coating process with the clear, viscous, pale yellowish precursor solution. For this purpose, the solution was introduced into the tube and, after a residence time of 1 minute, pumped out again. The sample was dried under air for 24 h and then cured in a drying cabinet at a temperature of 80° C. for 12 h in air, and cooled to room temperature.

After the crosslinking of the polymer to form a thermoset, the layer was pyrolyzed to carbon, using the following procedure:

1. Increase in temperature at 0.5 K/min from room temperature to 380° C. under nitrogen,
2. Holding time of 1 hour at 380° C. under nitrogen,
3. Increase in temperature at 0.6 K/min from 380 to 500° C. under nitrogen,
4. Holding time of 10 minutes at 500° C. under nitrogen,
5. Switch of atmosphere from nitrogen to argon,
6. Increase in temperature at 1 K/min from 500° C. to the final pyrolysis temperature under argon,
7. Holding time of 1 hour at the final pyrolysis temperature under argon, 8. Cooling at 5K/min from the final pyrolysis temperature to 500° C. under argon,
9. Switch of atmosphere from argon to nitrogen,
10. Cooling at 5 K/min from 500° C. to room temperature under nitrogen.

The composition of the polyester, the crosslinker fraction, and the final pyrolysis temperature can be seen from the results table of example 4.

Example 2

Process according to example 1, varying the proportions of the maleic anhydride/phthalic anhydride/1,2-propanediol reactants in the range between 0.2/0.05/0.25 mol and 0.07/0.43/0.5 mol.

Example 3

Process according to example 1, using a mesoporous γ-$Al_2O_3$ layer sintered at 300° C., 500° C. and 650° C.

For the characterization of the separation properties of the carbon membranes from examples 1 to 3, individual-gas and mixture-gas measurements were carried out at a temperature of 150° C. on a gas measurement setup. The permeation measurement of the individual gases was carried out by means of the pressure increase method, with the permeance in this case being ascertainable from the linear pressure increase over time. The mixture-gas measurements were performed using an $H_2/C_3H_8$ mixture consisting of 80% by volume hydrogen and 20% by volume propane, with a transmembrane pressure of 1.5 bar (feed pressure 2.5 bar; permeate pressure 1.0 bar abs.). The overall flow rate was measured by means of a gas bubble counter, and the permeances were calculated with the aid of the feed pressure and permeate pressure for $H_2$ and propane from the composition of the feed, retentate, and permeate. The permeance is the flow rate per m² of membrane area, time and pressure, with the pressure used being the partial pressure difference (driving force) of the corresponding gas. The permselectivity is then given from the ratio of the two permeances ascertained.

50% by weight styrene), the support used for the coating (topmost interlayer: boehmite sol sintered at 500° C.), the coating with the precursor solution, the drying (24 hours at room temperature under air), the crosslinking (12 hours at 80° C. under air), and the final pyrolysis (1 hour at 650° C. under Ar) took place as described in detail in example 1.

For the investigation of the separation properties of the carbon membranes, a test setup was used to carry out mixture-gas measurements at temperatures between 150 and 450° C. and also at feed pressures of between 1 and 10 bar absolute. The measurements were made using an $H_2/C_3H_8$ mixture consisting of about 50% by volume hydrogen and 50% by volume propane; the permeate pressure was approximately 1 bar absolute. The overall retentate and permeate flow rates were measured by means of gas meters, and the gas composition of the feed, retentate and permeate was measured by means of an online gas chromatograph. In addition, the pressures and temperatures were recorded. The individual flow rates (units=$Nm^3/h/m^2$; $Nm^3$=cubic meter under standard temperature and pressure conditions) were calculated from the overall flow rate and from the composition of the permeate. The permeances (flow rate standardized for the driving force, units=$Nm^3/h/m^2/bar$, driving force=partial pressure difference between feed/retentate and permeate) are then given by the compositions of feed/retentate and of permeate, and also the associated pressures. The permselectivity is given by the ratio of the two permeances ascertained.

Table 2 shows the data measured and calculated for the membrane under different conditions:

I: Variation of the feed/retentate pressure between 2.6 and 10.2 bar absolute at 300° C.

II. Variation of the temperature between 200 and 350° C. with a feed/retentate pressure of 7.1 bar absolute.

The results show that at a constant temperature of 300° C., an increase in the transmembrane pressure (TMP=arithmetic mean of feed pressure and retentate pressure minus permeate pressure) is accompanied by a drop in the hydrogen per-

TABLE 1

| Membrane | baking temperature of support membrane (° C.) | Precursor | Dicarboxylic acid Ma (mol %) | Dicarboxylic acid Pa (mol %) | Crosslinker Styrene (wt %) | Crosslinking Temperature (° C.) | Crosslinking Time (h) | Pyrolysis Temperature (° C.) | Pyrolysis Time (h) | Individual measurements Permeance ($Nm^3/m^2/h/bar$) H2 | Individual measurements Permeance ($Nm^3/m^2/h/bar$) C3 | Individual measurements Permeance ($Nm^3/m^2/h/bar$) SF6 | Mixture measurement Permeance ($Nm^3/m^2/h/bar$) H2 | Mixture measurement Permselectivity H2/C3 |
|---|---|---|---|---|---|---|---|---|---|---|---|---|---|---|
| PES-1 | unsintered | PES | 25 | 25 | 50 | 80 | 12.0 | 650 | 1.0 | 10.2 | 0.062 | 0.030 | 6.9 | 41 |
| PES-2 | 300 | PES | 25 | 25 | 50 | 80 | 12.0 | 700 | 1.0 | 4.7 | 0.007 | | 4.0 | 362 |
| PES-3 | 500 | PES | 25 | 25 | 50 | 80 | 12.0 | 650 | 1.0 | 6.8 | 0.006 | 0.002 | 5.6 | 418 |
| PES-4 | 500 | PES | 25 | 25 | 50 | 80 | 12.0 | 700 | 1.0 | 5.7 | 0.002 | | 4.8 | 68884 |
| PES-5 | 500 | PES | 7 | 43 | 50 | 80 | 12.0 | 700 | 1.0 | 4.6 | 0.069 | 0.034 | 3.1 | 19 |
| PES-6 | 500 | PES | 40 | 10 | 50 | 80 | 12.0 | 700 | 1.0 | 3.1 | 0.000 | 0.000 | 2.5 | 29703 |
| PES-7 | 500 | PES | 25 | 25 | 50 | 80 | 4.5 | 750 | 1.0 | 2.3 | 0.001 | 0.000 | 3.1 | 767 |
| PES-8 | 500 | PES | 25 | 25 | 50 | 80 | 12.0 | 700 | 1.0 | 6.2 | 0.002 | 0.001 | 4.2 | 594 |
| PES-9 | 500 | PES | 25 | 25 | 50 | 250 | 1.0 | 750 | 1.0 | 7.6 | 0.006 | 0.003 | | |

Example 4

The preparation of the precursor solution (polyester: 25 mol % maleic anhydride, 25 mol % phthalic anhydride and 50 mol % 1,2-propanediol; solution: 50% by weight PES and meance from 9.9 to 5.9 $Nm^3/h/m^2/bar$ and in the permselectivity from 930 to 400.

The temperature increase with a constant feed/retentate pressure of 7.1 bar absolute shows that not only the flow rate and the permeance of hydrogen but also the hydrogen-to-propane permselectivity are increased.

TABLE 2

| | | Feed/retentate | | | | Permeate | | | | | | | | |
| | | | | | | Flow rate | Concentration | | Flow rate C3 | Flow rate H2 | | Permeance P | | |
| Temperature (°C.) | Retentate flow rate (Nm³/h) | Pressure (bar) | C3 (vol %) | H2 (vol %) | Pressure (bar) | (Nm³/h/m²) | C3 (vol %) | H2 (vol %) | (Nm³/h/m²) | (Nm³/h/m²) | TMP (bar) | C3 (Nm³/h/m²/bar) | H2 (Nm³/h/m²/bar) | Permselectivity (P(H2)/P(C3)) |
|---|---|---|---|---|---|---|---|---|---|---|---|---|---|---|
| I: Variation in pressure | | | | | | | | | | | | | | |
| 300 | 0.18 | 2.6 | 50.4 | 49.6 | 1.1 | 1.9 | 0.7 | 99.3 | 0.014 | 1.9 | 1.5 | 0.011 | 9.9 | 932 |
| 300 | 0.18 | 4.2 | 51.8 | 48.2 | 1.1 | 6.6 | 0.4 | 99.6 | 0.026 | 6.6 | 3.0 | 0.012 | 7.6 | 637 |
| 300 | 0.18 | 7.2 | 54.4 | 45.6 | 1.2 | 14.2 | 0.4 | 99.6 | 0.052 | 14.1 | 6.0 | 0.013 | 6.6 | 495 |
| 300 | 0.18 | 10.2 | 51.0 | 49.0 | 1.2 | 22.5 | 0.3 | 99.7 | 0.076 | 22.4 | 9.0 | 0.015 | 5.9 | 400 |
| II: Variation in temperature | | | | | | | | | | | | | | |
| 200 | 0.17 | 7.1 | 51.4 | 48.6 | 1.1 | 11.5 | 0.4 | 99.6 | 0.046 | 11.4 | 5.9 | 0.013 | 5.0 | 394 |
| 250 | 0.17 | 7.1 | 51.8 | 48.2 | 1.2 | 12.7 | 0.4 | 99.6 | 0.045 | 12.7 | 5.9 | 0.012 | 5.6 | 457 |
| 300 | 0.18 | 7.2 | 54.4 | 45.6 | 1.2 | 14.2 | 0.4 | 99.6 | 0.052 | 14.1 | 6.0 | 0.013 | 6.6 | 495 |
| 350 | 0.17 | 7.1 | 52.3 | 47.7 | 1.2 | 15.8 | 0.3 | 99.7 | 0.052 | 15.8 | 5.9 | 0.014 | 7.1 | 505 |

The invention claimed is:

1. A process for producing a carbon membrane, the process comprising:
    coating a porous substrate with a solution of ethylenically unsaturated polyester to form a polyester coating,
    drying the polyester coating on the porous substrate by removing solvent to form a dry polyester coating, and
    pyrolyzing the dry polyester coating on the porous substrate, thereby forming the carbon membrane,
    wherein any of the coating, drying, or pyrolyzing or a sequence of the coating, drying, and pyrolyzing is optionally conducted more than once.

2. The process according to claim 1, wherein the ethylenically unsaturated polyester has repeat units of aliphatic diols, aromatic dicarboxylic acids, and ethylenically unsaturated dicarboxylic acids.

3. The process according to claim 2, wherein the aliphatic diols are $C_{2-12}$-alkanediols.

4. The process according to claim 2, wherein the ethylenically unsaturated dicarboxylic acids are maleic acids.

5. The process according to claim 1, wherein the solution of ethylenically unsaturated polyester further comprises a crosslinking ethylenically unsaturated monomer and a free-radical former as a crosslinking initiator.

6. The process according to claim 5, wherein the crosslinking ethylenically unsaturated monomer is styrene or α-methylstyrene.

7. The process according to claim 1, wherein the porous substrate is selected from the group consisting of a porous metal, a porous ceramic, a porous glass, and a porous composite thereof.

8. The process according to claim 1, wherein the porous substrate has a mesoporous ceramic oxide layer of $TiO_2$, $ZrO_2$, $Al_2O_3$, $SiO_2$, or a mixture thereof, and the mesoporous ceramic oxide layer is coated with the solution of ethylenically unsaturated polyester.

9. The process according to claim 8, wherein the mesoporous ceramic oxide layer is formed from γ-$Al_2O_3$.

10. The process according to claim 8, wherein the mesoporous ceramic oxide layer has a baking temperature below a pyrolysis temperature in the pyrolyzing.

11. The process according to claim 1, wherein the pyrolyzing is conducted at a temperature of from 500 to 900° C.

12. The process according to claim 11, wherein the pyrolyzing is conducted at a temperature of up to 500° C. under nitrogen and above 500° C. under argon.

13. The process according to claim 10, wherein an unbaked form of the mesoporous ceramic oxide layer is coated with the solution of ethylenically unsaturated polyester.

* * * * *